United States Patent
Jeong et al.

(10) Patent No.: US 9,635,606 B2
(45) Date of Patent: Apr. 25, 2017

(54) ACCESS POINT SELECTION AND MANAGEMENT

(71) Applicant: KT CORPORATION, Gyeonggi-do (KR)

(72) Inventors: Yang-Seok Jeong, Gyeonggi-do (KR); Jong-Hwa Shin, Seoul (KR); Jeong-Hun Shim, Gyeonggi-do (KR); Weon-Yong Joo, Seoul (KR); Mi-Ji Choi, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 14/547,108

(22) Filed: Nov. 18, 2014

(65) Prior Publication Data

US 2015/0139010 A1    May 21, 2015

(30) Foreign Application Priority Data

Nov. 18, 2013  (KR) .................. 10-2013-0139730

(51) Int. Cl.
*H04W 48/20* (2009.01)
(52) U.S. Cl.
CPC .................. *H04W 48/20* (2013.01)
(58) Field of Classification Search
None
See application file for complete search history.

(56) References Cited

U.S. PATENT DOCUMENTS

| | | |
|---|---|---|
| 6,522,881 B1 | 2/2003 | Feder et al. |
| 7,583,625 B2 | 9/2009 | Bennett |
| 7,653,386 B2 | 1/2010 | Bennett |
| 7,676,241 B2 | 3/2010 | Bennett |
| 7,720,038 B2 | 5/2010 | Bennett |
| 7,787,901 B2 | 8/2010 | Bennett |
| 7,830,845 B2 | 11/2010 | Bennett |
| 7,864,742 B2 | 1/2011 | Bennett |
| 7,894,846 B2 | 2/2011 | Bennett |
| 8,112,074 B2 | 2/2012 | Bennett |
| 8,161,302 B2 | 4/2012 | Woo |
| 8,169,989 B2 | 5/2012 | Bennett |
| 8,170,546 B2 | 5/2012 | Bennett |
| 2002/0080024 A1* | 6/2002 | Nelson, Jr. ........ H04W 56/0085 340/503 |
| 2003/0171116 A1 | 9/2003 | Soomro |
| 2004/0137908 A1 | 7/2004 | Sinivaara et al. |
| 2004/0202141 A1 | 10/2004 | Sinivaara et al. |
| 2004/0266493 A1 | 12/2004 | Bahl et al. |

(Continued)

FOREIGN PATENT DOCUMENTS

| | | |
|---|---|---|
| JP | 2008-060994 A | 3/2008 |
| KR | 10-2005-0101070 A | 10/2005 |

(Continued)

*Primary Examiner* — Omar Ghowrwal
*Assistant Examiner* — Angel Brockman
(74) *Attorney, Agent, or Firm* — IP Legal Services, LLC

(57) ABSTRACT

The disclosure is related to a method of selecting one of access points based on multiple quality parameters in different frames. The method may include receiving a probe response frame from access points, analyzing quality parameters included in the received probe response frame to estimate wireless link quality of each access point, and selecting one of the access points based on the analysis result.

19 Claims, 7 Drawing Sheets

(56) References Cited

U.S. PATENT DOCUMENTS

| | | |
|---|---|---|
| 2005/0226183 A1 | 10/2005 | Penumetsa |
| 2005/0250528 A1 | 11/2005 | Song et al. |
| 2007/0248033 A1 | 10/2007 | Bejerano et al. |
| 2008/0056177 A1 | 3/2008 | Mori et al. |
| 2008/0056201 A1 | 3/2008 | Bennett |
| 2008/0080388 A1* | 4/2008 | Dean .................. H04L 12/2697 370/252 |
| 2008/0102852 A1 | 5/2008 | Du et al. |
| 2009/0116448 A1 | 5/2009 | Nam et al. |
| 2009/0197603 A1 | 8/2009 | Ji et al. |
| 2010/0091669 A1* | 4/2010 | Liu ........................ H04L 45/20 370/252 |
| 2010/0118851 A1 | 5/2010 | Kim et al. |
| 2010/0124204 A1 | 5/2010 | Won |
| 2010/0157835 A1* | 6/2010 | Zhang .................. H04W 36/30 370/252 |
| 2010/0177656 A1 | 7/2010 | Kim et al. |
| 2010/0177756 A1 | 7/2010 | Choi et al. |
| 2010/0303051 A1 | 12/2010 | Umeuchi et al. |
| 2011/0013533 A1 | 1/2011 | Bennett |
| 2011/0013608 A1 | 1/2011 | Lee et al. |
| 2011/0110282 A1* | 5/2011 | Wu .................. H04W 52/0235 370/311 |
| 2011/0216692 A1 | 9/2011 | Lundsgaard et al. |
| 2011/0222421 A1* | 9/2011 | Jana .................. H04L 63/1441 370/252 |
| 2011/0299422 A1 | 12/2011 | Kim et al. |
| 2012/0063337 A1 | 3/2012 | Shukla |
| 2012/0155350 A1 | 6/2012 | Wentink et al. |
| 2012/0287859 A1 | 11/2012 | Ji et al. |
| 2013/0003679 A1 | 1/2013 | Seok et al. |
| 2014/0003254 A1* | 1/2014 | Andreoli-Fang ..... H04W 48/12 370/252 |
| 2014/0092731 A1* | 4/2014 | Gupta .................. H04L 5/0055 370/229 |

FOREIGN PATENT DOCUMENTS

| | | |
|---|---|---|
| KR | 10-0700085 B1 | 3/2007 |
| KR | 10-2009-0006100 A | 1/2009 |
| KR | 10-2009-0011260 A | 2/2009 |
| KR | 10-2009-0013180 A | 2/2009 |
| KR | 10-0948506 B1 | 3/2010 |
| KR | 10-2010-0056624 A | 5/2010 |
| KR | 10-2010-0080740 A | 7/2010 |
| KR | 10-2010-0083703 A | 7/2010 |
| KR | 10-2010-0084138 A | 7/2010 |
| KR | 10-2010-0114109 A | 10/2010 |
| KR | 10-2011-0006906 A | 1/2011 |
| KR | 10-2011-0027042 A | 3/2011 |
| KR | 10-2011-0065996 A | 6/2011 |
| KR | 10-1039617 B1 | 6/2011 |
| KR | 10-2011-0089802 A | 8/2011 |
| KR | 10-2013-0093662 A | 8/2013 |
| WO | 2004/064439 A1 | 7/2004 |
| WO | 2012/068349 A1 | 5/2012 |

* cited by examiner

ACCESS POINT SELECTION AND MANAGEMENT

CROSS REFERENCE TO PRIOR APPLICATIONS

The present application claims priority under 35 U.S.C. §119 to Korean Patent Application No. 10-2013-0139730 (filed on Nov. 18, 2013).

The subject matter of this application is related to U.S. patent application Ser. No. 13/668,313 filed Nov. 4, 2012, and U.S. patent application Ser. No. 13/668,310 filed Nov. 4, 2012, the teachings of which are incorporated herein their entirety by reference.

BACKGROUND

The present disclosure relates to communication and, more particularly, to selecting an access point based on various quality parameters and maintaining a link with a predetermined wireless link quality.

When user equipment is located at an area where multiple access points are available, the user equipment needs to select one having better link quality than others. Typically, user equipment considers signal strength of a probe response frame to estimate a wireless link quality. For example, user equipment may search and select one of access points using signal strength of probe response frames transmitted from the access points. However, it is not proper to use the signal strength of the probe response frame as only a quality parameter to estimate wireless link quality. The signal strength of signals associated with access points dynamically varies due to various factors, such as the number of user equipment coupled to an access point, interference/noise signal strength around an access point, channel utilization, available admission capacity, and so forth. Accordingly, the signal strength of the probe response frame is not stable and accurate parameter to estimate wireless link quality.

Furthermore, since a downlink signal transmitted from an access point typically has signal strength higher than that of an uplink signal transmitted from user equipment, the signal strength of the probe response frame (e.g., downlink signal) cannot represent overall quality of communication link between user equipment and an access point. When an access point is improperly selected and coupled to user equipment based on inaccurate quality parameters, it might cause interruption in a communication service and deteriorate overall performance in the communication service.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, one of access points may be selected based on various quality parameters in multiple frames.

In accordance with another aspect of the present invention, wireless link quality of an access point may be maintained after establishing a communication link to the access point.

In accordance with still another aspect of the present invention, a wireless link quality may be evaluated using various quality parameters in multiple different frames as well as signal strength of a probe response message.

In accordance with at least one embodiment, a method may be provided for selecting one of access points by user equipment in a wireless local area network. The method may include receiving a probe response frame from access points, analyzing quality parameters included in the received probe response frame to estimate wireless link quality of each access point, and selecting one of the access points based on the analysis result.

The received probe response frame may include at least one of a basic service set (BSS) load information element and a vender specific information element. The quality parameters may include at least one of station count, channel utilization, and available admission capacity.

The received probe response frame may include information on allowable access conditions of a corresponding access point and current states measured by the corresponding access point. The information on allowable access conditions may include at least one of an uplink received signal strength threshold, a downlink received signal strength threshold, a station count threshold, and a channel utilization threshold and the information on current states includes at least one of an uplink received signal strength, an access point noise level, and a wide area network information, measured and collected by a corresponding access point.

The method may include transmitting a standard protocol query frame to the access points, receiving a standard protocol response frame from the access points, and analyzing quality parameters included in the received standard protocol response frame to estimate wireless link quality of each access point. The standard protocol query frame may be an access network query protocol (ANQP) defined in Institute of Electrical and Electronics Engineers (IEEE) 802.11u. The standard protocol query frame may include information on a wide area network metric, a downlink speed, an uplink speed, a downlink load, and an uplink load. The standard protocol query frame may include information on allowable access conditions of a corresponding access point and current states measured and collected by the corresponding access point. The information on allowable access conditions may include a neighbor access point list, an uplink received signal strength threshold, a station count threshold, and a channel utilization threshold. The information on current states may include an uplink received signal strength, an access point noise level, a station count, and a channel utilization, measured and collected by a corresponding access point.

The method may include repeatedly transmitting a link quality measurement request frame to the access points at a predetermined interval for predetermined times, receiving at least one link quality measurement response frame from the access points in response to the link quality measurement request frames, and analyzing quality parameters in the received link quality measurement response frame.

The quality parameters of the link quality measurement response frame may include a number of link quality measurement request frames received at a corresponding access point and a received signal strength of a link quality measurement request frame, measured by the corresponding access point.

Quality parameters in a latest link quality measurement response frame received by the user equipment may be analyzed to select one of the access points.

The method may further include monitoring a wireless link established to the selected access point. The monitoring may include repeatedly transmitting a link quality measurement (LQM) request frame to the selected access point at a predetermined interval for predetermined times, receiving at least one LQM response frame from the selected access point in response to the LQM request frames, analyzing quality parameters in the received LQM response frame, and determining whether to maintain the wireless link established to the selected access point based on the analysis result. The monitoring may include transmitting a link quality information (LQI) request frame to the selected access point, receiving a LQI response frame from the selected access point, analyzing quality parameters in the received LQI response frame, and determining whether to maintain the wireless link established to the selected access point based on the analysis result. The LQI request frame may include a list of quality parameters for requesting a corresponding access point to measure and the LQI response frame may include state information on the requested quality parameters.

An access point receiving the LQI request frame may monitor the requested quality parameters in the list and transmits the LQI response frame when the monitoring result of the requested quality parameters is not satisfied by a predetermined condition.

In accordance with another embodiment, a method may be provided for selecting one of access points by user equipment in a wireless local area network. The method may include receiving a probe response frame from each access point, analyzing quality parameters included in the received probe response frame to estimate wireless link quality of each access point, selecting at least one of the access points as candidate access points based on the analysis result, transmitting a standard protocol query frame to the candidate access points, receiving a standard protocol response frame from the candidate access points, analyzing quality parameters included in the received standard protocol response frame to estimate wireless link quality of each access point, selecting one of the candidate access points based on the analysis result, establishing a link to the selected access point, and monitoring the established link using a link quality measurement protocol.

In accordance with still another embodiment, a method may be provided for selecting one of access points by user equipment in a wireless local area network. The method may include repeatedly transmitting a link quality measurement request frame to access points at a predetermined interval for predetermined times, receiving at least one link quality measurement response frame from the access points in response to the link quality measurement request frames, analyzing quality parameters in the received link quality measurement response frame, selecting one of the access points based on the analysis result, establishing a link to the selected access point, and monitoring the established link using a link quality information request frame and a link quality information response frame.

BRIEF DESCRIPTION OF THE DRAWINGS

The above and/or other aspects of some embodiments of the present invention will become apparent and more readily appreciated from the following description of embodiments, taken in conjunction with the accompanying drawings, of which.

DETAILED DESCRIPTION OF EMBODIMENTS

Figure 1:
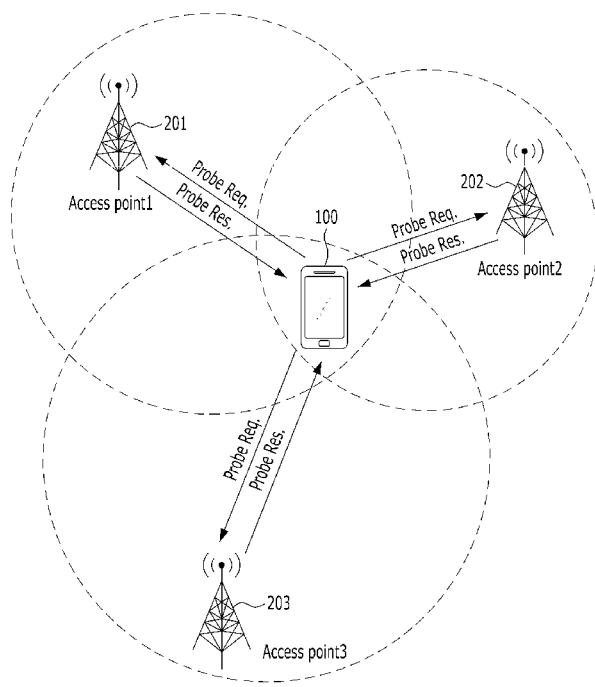
FIG. 1 illustrates a wireless local area network (WLAN) in accordance with at least one embodiment.

Reference will now be made in detail to exemplary embodiments of the present invention, examples of which are illustrated in the accompanying drawings, wherein like reference numerals refer to like elements throughout. The embodiments are described below, in order to explain embodiments of the present invention by referring to the figures.

In accordance with at least one embodiment, various quality parameters in multiple frames may be used to estimate a wireless link quality of access points. For example, user equipment may select one of access points to access in consideration of a plurality of quality parameters included in multiple different frames exchanged between the user equipment and the access points. In particular, the user equipment may analyze at least one of: i) a probe request frame and a probe response frame; ii) standard protocol frames (e.g., access network query protocol (ANQP) frames), not including the probe request frame and the probe response frame; iii) a Link Quality Measurement (LQM) request frame and a LQM response frame; and iv) a Link Quality Information (LQI) request frame and a LQI response frame. In order to reflect various factors in a wireless network environment, a new protocol, a LQM protocol, is defined in accordance with at least one embodiment, and the LQM request frame, the LQM response frame, the LQI request frame, and the LQI response frame are defined in such a new protocol, the LQM protocol.

Before describing selecting one of access points based on various types of quality parameters, a wireless local area network will be described with reference to FIG. 1. In FIG. 1, a wireless local area network is a communication network defined in IEEE 802.11. Since a wireless local area network, user equipment, access points, and related frames and messages exchanged therebetween are defined and described in IEEE 802.11, the detailed description thereof will be omitted herein.

FIG. 1 illustrates a wireless local area network (WLAN) in accordance with at least one embodiment.

Referring to FIG. 1, a wireless LAN may include user equipment 100 and a plurality of access points 201 to 203. In such a wireless LAN, user equipment 100 may select one of access points 201 to 203, be coupled to the selected one of access points 201 to 203, and perform communication through the selected one of access points 201 to 203. A basic service set (BSS) of the wireless LAN is at least one user equipment and an access point coupled to user equipment 100. For example, in order to communicate with other parities, user equipment 100 selects one of access points 201 to 203 and establishes a wireless communication link to the selected access point. Such an access point scan procedure may be classified into two methods, a passive access point scan method and an active access point scan method.

In the passive access point scan method, access points 201 to 203 may regularly broadcast a beacon frame including a service set ID and a basic service set ID. Through the beacon signal, user equipment 100 may be aware of connectable access points 201 to 203 and obtain information for selecting and accessing access points 201 to 203. In the active access point scan method, access points 201 to 203 may transmit a probe response frame to user equipment 100 upon receipt of a probe request frame transmitted from user equipment 100. Based on the probe request frame and the probe response frame, user equipment 100 may be aware of connectable access points 201 to 203 and obtain information for accessing one of access points 201 to 203.

For example, FIG. 1 illustrates the active access point scan method. As shown in FIG. 1, user equipment 100 transmits a probe request frame to access points 201 to 203 and access points 201 to 203 transmit a probe response frame to user equipment 100 in response to the probe request frame. User equipment 100 may obtain information for selecting and accessing access points 201 to 203 from the received probe response frames and estimate wireless link quality of each access point based on the obtained information. User equipment selects one of access points 201 to 203 based on the estimated wireless link quality and information on functions of each access point. Such a procedure of selecting and coupling in a wireless local area network will be described with reference to FIG. 2.

Figure 2:
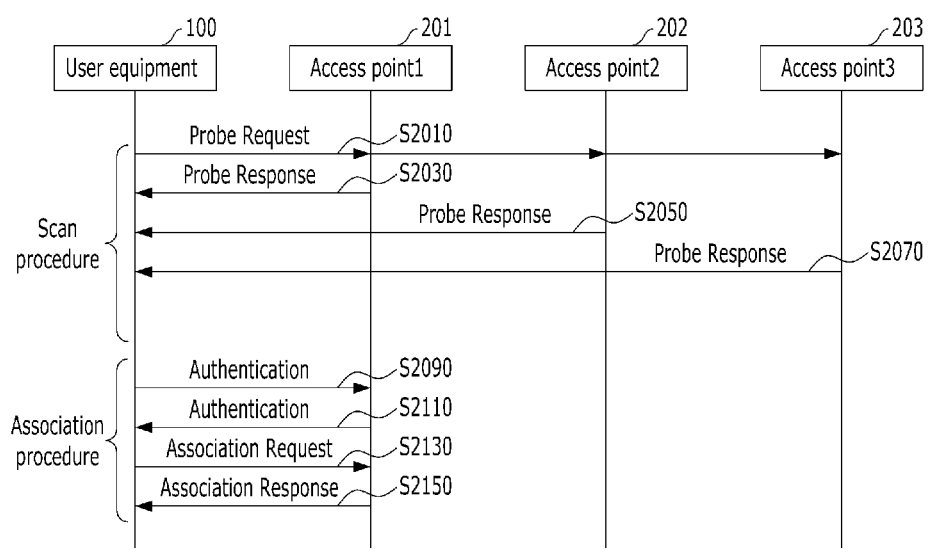
FIG. 2 illustrates a typical method of scanning and selecting one of access points.

FIG. 2 illustrates a typical method of scanning and selecting one of access points.

Referring to FIG. 2, at step S2010, user equipment 100 transmits a probe request frame to access points 201 to 203. In response to the probe request frame, access points 201 to 203 transmit a probe response frame to user equipment 100 at steps S2030, 2050, and S2070. User equipment 100 may select an access point providing comparatively higher wireless link quality than others from access points 201 to 203 based on information included in probe response frames. That is, user equipment 100 measures signal strength of the probe response frame and uses the measured signal strength as a parameter to estimate a wireless link quality. User equipment 100 selects one transmitting a probe response frame with the highest received signal strength from access points 201 to 203.

At step 2090, user equipment 100 requests the selected access point (e.g., access point 201) to perform authentication. At step S2110, access point 201 transmits an authentication response frame to user equipment 100 as a result of authentication. At step S2130, user equipment 100 transmits an association request frame to access point 201. At step S2104, access point 201 transmits an association response frame to user equipment 100. User equipment 100 accesses access point 201 and perform communication through access point 201.

As described, user equipment 100 may scan and select one of access points 201 to 203 based on the signal strength of the probe response frame. That is, the signal strength of the probe response frame is measured as a quality parameter to estimate wireless link quality. However, it is not proper to use the signal strength of the probe response frame as only a quality parameter to estimate wireless link quality. The signal strength of signals associated with access points dynamically varies due to various factors, such as the number of user equipment coupled to an access point, interference/noise signal strength around an access point, channel utilization, available admission capacity, and so forth. Accordingly, the signal strength of the probe response frame is not stable and accurate parameter to estimate wireless link quality. Furthermore, since a downlink signal transmitted from an access point typically has signal strength higher than that of an uplink signal transmitted from user equipment, the signal strength of the probe response frame (e.g., downlink signal) cannot represent overall quality of communication link between user equipment and an access point. When an access point is improperly selected and coupled to user equipment based on inaccurate quality parameters, it might cause interruption in a communication service and deteriorate overall performance in the communication service.

In accordance with at least one embodiment, various types of quality parameters may be used to estimate wireless link quality of access points. For example, user equipment may select one of access points to access in consideration of a plurality of quality parameters included in multiple different frames exchanged between the user equipment and the access points. In particular, the user equipment may analyze at least one of: i) a probe request frame and a probe response frame; ii) standard protocol frames (e.g., access network query protocol (ANQP) frames), not including the probe request frame and the probe response frame; iii) a Link Quality Measurement (LQM) request frame and a responding LQM response frame; and iv) a Link Quality Information (LQI) request frame and a responding LQI response frame. In order to reflect various factors in a wireless network environment, a new protocol may be defined in accordance with at least one embodiment, and the LQM request frame, the responding LQM response frame, the LQI request frame, and the responding LQI response frame are defined in such a new protocol. Such frames may include various quality parameters that provide user equipment with information on wireless link quality of access points.

In accordance with at least one embodiment of the present disclosure, one of access points may be selected as a servicing access point based on various quality parameters in multiple different frames in addition to signal strength indicated by a probe response frame. For example, user equipment may evaluate various types of quality parameters including station count, channel utilization, available admission capacity, downlink signal strength, uplink signal strength, interference/noise signal strength, and backhaul state, but the present invention is not limited thereto. In addition, user equipment may use multiple frames to obtain the quality parameters and estimate wireless link quality, such as probe request/response frames, ANQP query/response frames, LQM request/response frames, and LQI request/response frames. Hereinafter, selecting one of access points and maintaining proper wireless link quality in consideration of multiple quality parameters and frames in accordance with at least one embodiment will be described with reference to FIG. 3.

Figure 3:
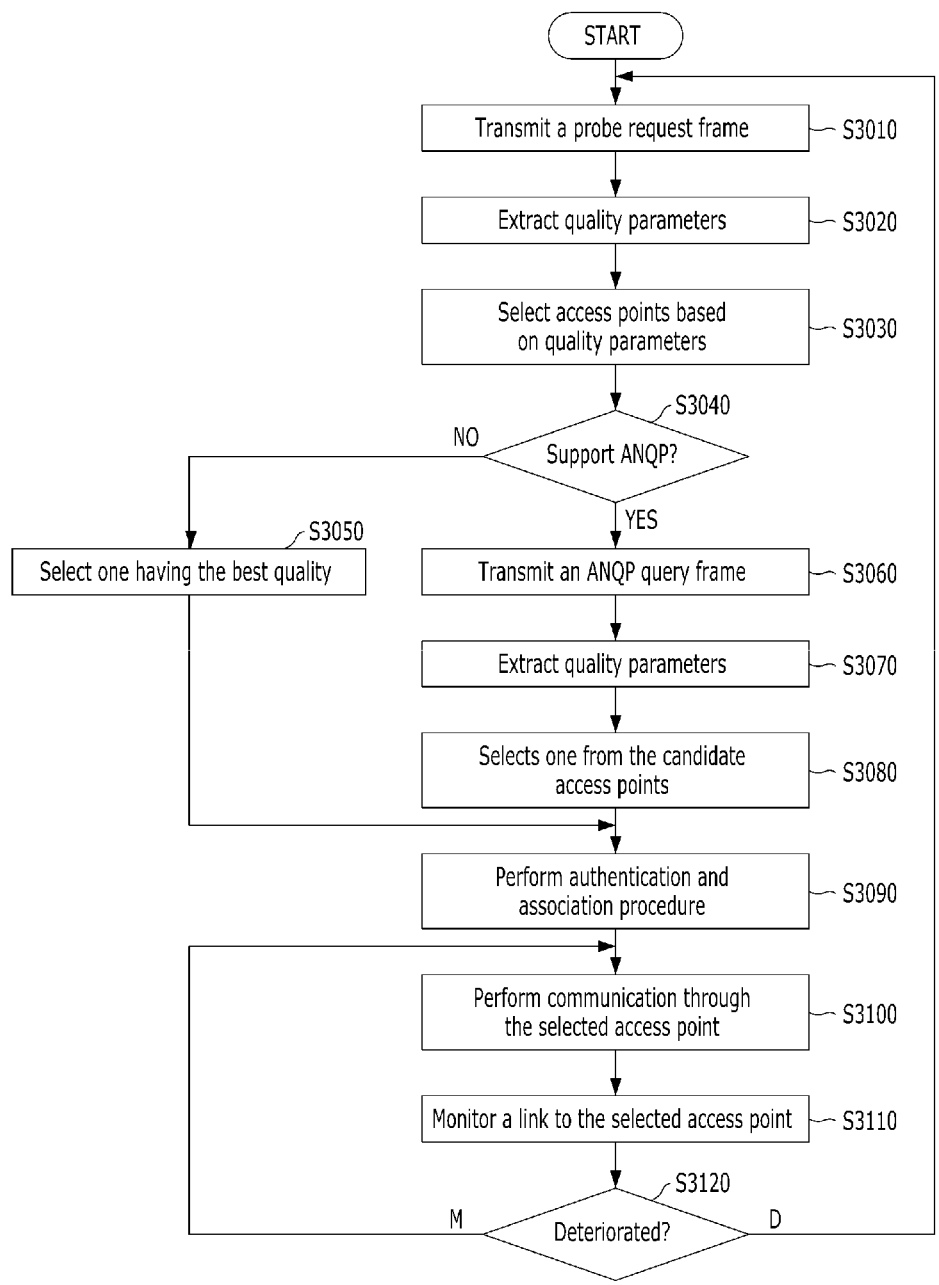
FIG. 3 illustrates selecting one of access points and maintaining wireless link quality at a predetermined quality level in consideration of probe request/response frames, ANQP query/response frames, and LQI request/response frames in accordance with at least one embodiment.

FIG. 3 illustrates selecting one of access points and maintaining wireless link quality at a predetermined quality level in consideration of probe request/response frames, ANQP query/response frames, and LQI request/response frames in accordance with at least one embodiment.

Referring to FIG. 3, user equipment may transmit a probe request frame to access points and receive probe response frames from access points in response to the probe request frame at step S3010. At step S3020, user equipment may extract quality parameters from the probe response frames and analyze wireless link qualities of the access points based on the extracted quality parameters. At step S3030, user equipment selects at least one satisfying selection requirements from the plurality of access points based on the analysis results, as candidate access points. The quality parameters, the analysis method, and the selection method will be described in detail with reference to FIG. 4.

At step S3040, user equipment determines whether more than two access points are selected and support an access network query protocol (ANQP). When one access point is selected and/or when all of the selected access point does not support the access network query protocol (ANQP) (No—S3040), user equipment may select one having the best quality based on the quality parameters at step S3050 and perform authentication and association procedures with the selected access point at step S3090.

When more than two access points are selected and the selected access points support the ANQP (Yes—S3040), the user equipment transmits an ANQP query frame to the selected access points as candidate access points and receives an ANQP response frame from the selected access points in response to the ANQP query frame at step S3060. At step S3070, the user equipment extracts quality parameters from the received ANQP response frame and analyze the extracted quality parameters. At step S3080, the user equipment selects one from the candidate access points based on a predetermined reference.

At step S3090, the user equipment performs authentication and association procedure with the selected access point. At step S3100, the user equipment performs communication through the selected access point. At step S3110, the user equipment monitors the link established to the selected access point using a LQM protocol including a LQM request frame and a LQM response frame or using a LQI request frame and a LQI response frame in accordance with at least one embodiment. Such a LQM protocol, the LQI request frame, and the LQI response frame will be described in detail with reference to FIG. 7, FIG. 8, and Table 8 and Table 9.

When the quality of the wireless link is deteriorated below a certain level (D-S3120), the user equipment performs the selection procedure again to maintain the link quality at a certain level at step S3010. The present invention is not limited thereto. For example, another selection method shown in FIG. 9 may be performed. When the wireless link quality maintains as the monitoring result (M-S3020), the user equipment continuously performs communication through the selected access point at step S3100.

As described in FIG. 3, one of access points may be selected based on the quality parameters not only in the probe response frame and but also in the ANQP response frame, but the present invention is not limited thereto. For example, predetermined quality parameters in other protocol frames (e.g., LQM protocol frames) may be used with quality parameters in at least one of the probe response frame and the ANQP response frame to select one of access points. Such operation will be described in detail with reference to FIG. 6.

In addition, user equipment may select one of access points by considering quality parameters in probe request/response frames separately from quality parameters in ANQP request/response frames in accordance with another embodiment. For example, an access point may be selected only based on the quality parameters only in the probe response frame. Furthermore, an access point may be selected only based on the quality parameters in the ANQP query response frame. Such a method for selecting an access point based on quality parameters related to an ANQP query frame and an ANQP response frame in accordance with at least one embodiment will be described in detail with reference to FIG. 5. That is, the operations S3050 to S3080 will be described in detail with reference to FIG. 5.

Hereinafter, a method for selecting an access point based on quality parameters related to a probe request frame and a probe response frame in accordance with at least one embodiment will be described in detail with reference to FIG. 4. That is, the operations S3010 to S3030 and S3050 will be described in detail with reference to FIG. 4.

Figure 4:
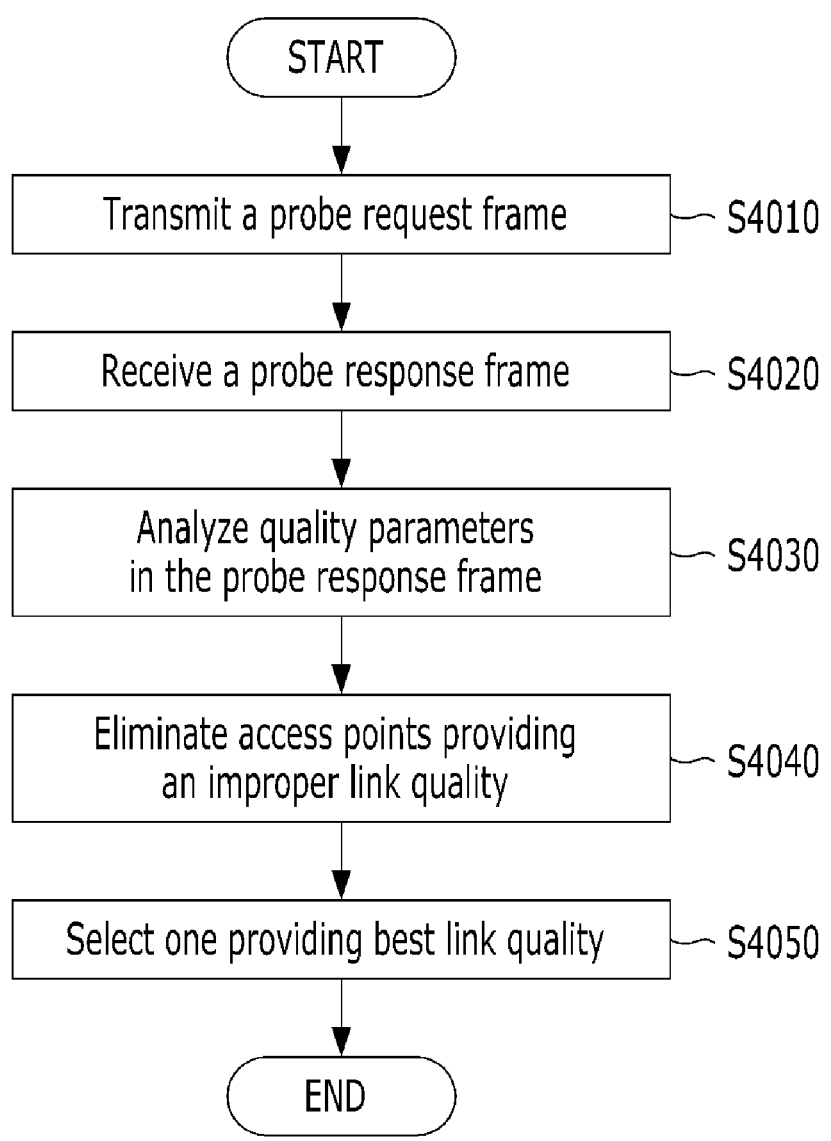
FIG. 4 illustrates a method for selecting an access point based on quality parameters related to a probe request frame and a probe response frame in accordance with at least one embodiment.

FIG. 4 illustrates a method for selecting an access point based on quality parameters related to a probe request frame and a probe response frame in accordance with at least one embodiment.

Referring to FIG. 4, when user equipment 100 detects multiple access points 201 to 203 available near to the location of user equipment 100, user equipment 100 may transmit a probe request frame to access points 201, 202, and 203 at step S4010. In response to the probe request frame, user equipment 100 receives probe response frames from access points 201 to 203 at step S4020.

In the step S4020, access points 201 to 203 collect various types of information on wireless link quality, generate the probe response frame to include the collected information, and transmit the generated probe response frame to user equipment 100. In order to include various types on information on wireless link quality, access points 201, 202, and 203 include a basic service set (BSS) load information element and a vender specific information element in the probe response frame. Such a BBS load information element is shown in Table 1.

TABLE 1

| Element ID | Length | Station Count | Channel Utilization | Available Admission Capacity |
| --- | --- | --- | --- | --- |
| 101 | 102 | 103 | 104 | 105 |

As shown in Table 1, the BSS load information element may include information on a current state of a corresponding access point and a wireless link provided by the corresponding access point. For example, the BSS load information element may include quality parameters, such as station count, channel utilization, and/or an available admission capacity. In particular, the BSS Load Information Element in a probe response frame includes: element ID field 101 for storing information on an element ID of the BSS load information element; length field 102 for storing information on a length of the BSS load information element; station count field 103 for storing information on the number of user equipment coupled to a corresponding access point; channel utilization field 104 for storing information on a channel utilization rate; and available admission capacity field 105 for storing information on a remaining amount of available medium time. That is, access points 201 to 203 may collect information on current states related to each quality parameter and provide the collected information to user equipment 100 through the probe response frame in accordance with at least one embodiment.

As described, access points 201 to 203 also include the vendor specific information element in the probe response frame in accordance with at last one embodiment. An access point may also collect information related to wireless link quality and include the collected information in the vendor specific information element. In particular, the vendor specific information element may include information on allowable conditions for accessing a corresponding access point. That is, the vendor specific information element may include thresholds, such as an uplink received signal strength (UL RSS) threshold, a downlink received signal strength (DL RSS) threshold, a station count threshold, and a channel utilization threshold. The vendor specific information may further include current states of a wireless link provided by a corresponding access point and a corresponding wireless local area network, such as an uplink received signal strength (UL RSS) and an access point noise level, which are measured by a corresponding access point. Table 2 below exemplary illustrates information included in the vendor specific information element in the probe response frame in accordance with at least one embodiment.

TABLE 2

| # | Quality parameters | Contents |
|---|---|---|
| 1 | Uplink received signal strength (UL RSS) Threshold | Allowable UP Probe request RSS by access point: 30 to −90 dBm |
| 2 | Downlink received signal strength (DL RSS) Threshold | Allowable DL Probe Response RSS by access point: 30 to −90 dBm |
| 3 | Station count Threshold | Allowable number of user equipment by access point: 0 to 255 |
| 4 | Channel Utilization Threshold | Allowable Channel Utilization by access point: 0 to 255 |
| 5 | Uplink received signal strength (UL RSS) | RSS of Probe request frame measured by access point: −30 to −90 dBm |
| 6 | AP Noise Level | Noise Level measured by access point: −30 to −90 dBm |
| 7 | WAN info | WAN Info field in WAN Metric Link Status: 1(up), 2(down) At Capacity: 0(Available), 1 (Full) |

As shown in Table 2, the Vendor Specific Information Element may include information on i) allowable access condition for providing a wireless link to user equipment and ii) current states measured by a corresponding access point. The allowable access condition may include 1) an uplink signal strength threshold, 2) a downlink signal strength threshold, 3) a station count threshold, and 4) a channel utilization threshold. The current state information may include information on signal strength of a probe request frame measured by an access point, interference/noise signal strength (e.g., noise level) measured by an access point, and corresponding wireless local area network information including a current backhaul state, a current station count, a current channel utilization rate.

Such vendor specific information element may inform user equipment of allowable access conditions to access a corresponding access point and a current state of the corresponding access point. That is, user equipment may use information in the vendor specific information element to select an access point that will provide a proper wireless link quality in accordance with at least one embodiment.

For example, access point 201 allows connections up to 100 devices and fully occupied. Access point 202 allows connections up to 300 devices and is currently connected with 200 devices. With the vendor specific information element in the probe response frame, user equipment selects access point 202 in accordance with at least one embodiment because access point 202 might have resources for 100 more devices to provide connection. If a probe response frame does not include such vendor specific information element, user equipment may select access point 201 based on the number of devices connected to each access point.

Access points 201 to 203 may set such an allowable access condition (e.g., threshold) to provide a proper wireless link quality to user equipment, but the present invention is not limited thereto. For example, access points 201 to 203 may set the allowable access conditions to provide a minimum wireless link quality or to provide a comparatively best wireless link quality to user equipment. Such allowable access conditions may be set in consideration of various factors such as a location of user equipment, a time, a date, statistical analysis, and so forth.

At step 4030, user equipment 100 may extract information related to the quality parameters from the probe response frame and analyze the extracted information. For example, user equipment 100 extracts the BSS load information element and the vendor specific information element from the probe response frame. That is, user equipment 100 determines current states of access points 201 to 203 and allowable conditions of access points 201 to 203 based on the extracted BSS load information element and vendor specific information element. Based on the determined current state and allowable conditions, user equipment 100 estimates the wireless link qualities provided by access points 201 to 203.

At step S4040, user equipment 100 may eliminate access points providing comparatively low wireless link quality. For example, user equipment 100 may compare the current states measured by access points 201 to 203 included in the BSS load information element, the allowable access conditions and the current states of a wireless local area network in the vendor specific information element, and current states of each access point estimated by user equipment 100. User equipment 100 eliminates access points not satisfying a predetermined requirement for providing a proper wireless link quality based on the comparison result. In accordance with at least one embodiment, a part or entire quality parameters may be used to select an access point. Furthermore, a different weight may be assigned to quality parameters in order to prioritize the quality parameters.

At step 4090, user equipment 100 may select an access point that provides a comparatively higher wireless link quality among available access points after elimination. For example, user equipment 100 may consider a part or all of the quality parameters to select an access point to access. Furthermore, a priority of each quality parameter may be considered to select an access point. That is, user equipment 100 may select an access point having a comparatively highest value in a quality parameter having a highest priority, but the present invention is not limited thereto.

As described above, an access point may be selected only based on the quality parameters in the ANQP query response frame. In addition to using the probe request frame and the probe response frame to select an access point, user equipment may use other standard protocol frames defined in IEEE 802.11 for selecting an access point. For example, quality parameters related to an access network query protocol (ANQP) may be used to select an access point in accordance with at least one embodiment. That is, quality parameters included in ANQP frames may be used to select an access point, but the present invention is not limited thereto. Such quality parameters in the ANQP frame may be also partially or entirely included the probe response frame. Hereinafter, a method for selecting an access point based on quality parameters related to an ANQP request frame and an ANQP response frame in accordance with at least one embodiment will be described with reference to FIG. 5, but the present invention is not limited thereto.

Furthermore, as described with reference to FIG. 3, after selecting multiple candidate access points from available access points based on the quality parameters in the probe response frame, user equipment 100 may select one from the candidate access points by considering the quality parameters in standard protocol frames (e.g., the ANQP response frame) again in accordance with at least one embodiment. Such operation will be described in detail with reference to FIG. 5. In addition, without using the quality parameters in the probe response frame, user equipment 100 may select one of available access points based on quality parameters in the standard protocol frames (e.g., ANQP response frame). Such operation will be described with reference to FIG. 5.

Figure 5:
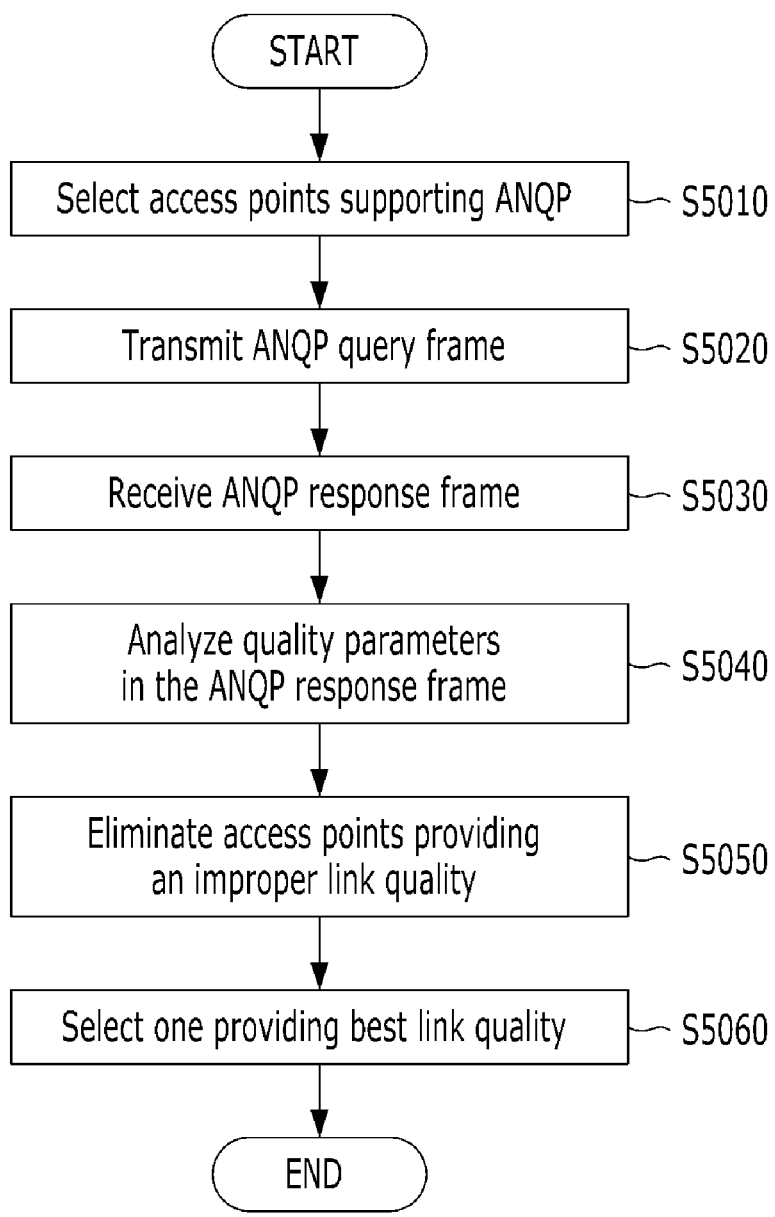
FIG. 5 illustrates a method for selecting an access point based on quality parameters related to an ANQP request frame and an ANQP response frame in accordance with at least one embodiment.

FIG. 5 illustrates a method for selecting an access point based on quality parameters related to an ANQP request frame and an ANQP response frame in accordance with at least one embodiment.

Referring to FIG. 5, user equipment 100 may determine access points supporting an ANQP from available access points or candidate access points after elimination based on the probe response frame at step S5010. Not all of available access points support the ANQP. Accordingly, user equipment 100 may select access points support the ANQP from the available access points or candidate access points remained after elimination based on the probe response frame. Such operation may prevent user equipment 100 from transmitting unnecessary signals to access points.

At step S5020, user equipment 100 may transmit an ANQP query frame to the selected access points supporting the ANQP. In response to the ANQP query frame, user equipment 100 receives ANQP response frames from the selected access points.

For example, an ANQP response frame may include information related to quality parameters included in a Generic Query List and a Vendor Specific Query List. The Generic Query List may include Wide Area Network (WAN) Metric information. An access point may collect the WAN metric information in the generic query list and include the collected information in the ANQP response frame as shown in Table 3 according to IEEE 8092.11u.

TABLE 3

| WAN Info | Downlink peed | Uplink Speed | Downlink Load | Uplink Load | UMD |
|---|---|---|---|---|---|
| 301 | 302 | 303 | 304 | 305 | 306 |

TABLE 4

| Link Status | Symmetric Link | At capacity | Reserved |
|---|---|---|---|
| 401 | 402 | 403 | 404 |

As shown in Table 3, as the quality parameters related to the Generic Query List, the ANQP response frame may include WAN Info field 301, Downlink speed field 302, uplink speed field 303, downlink load field 304, uplink load field 305, and UMD field 306. The WAN info field in Table 3 may further include quality parameters shown in Table 4. For example, the WAN info field includes Link Status field 401, Symmetric Link field 402, At capacity field 403, and reserved field 404. As described, an access point may collect information on current states related to the quality parameters included in the Generic Query List and generate the ANQP response frame to include the collected information.

Furthermore, an access point may collect information on quality parameters related to the Vendor Specific Query List and include the collected information in the ANQP response frame in accordance with at least one embodiment. The Vendor Specific Query List may include information on a list of neighbor access points to be roamed, allowable access conditions, and current states. For example, an ANQP Vendor Specific Query List may include information related to quality parameters shown in Table 5 below.

TABLE 5

| # | Quality parameters | Contents |
|---|---|---|
| 1 | Neighbor AP list | A list of neighbor access points having the same SSID |
| 2 | UL RSS Threshold | Allowable UP Probe request RSS by access point |
| 3 | DL RSS Threshold | Allowable DL Probe Response RSS by access point |
| 4 | Station count threshold | Allowable number of user equipment by access point |
| 5 | Channel Utilization threshold | Allowable Channel Utilization by access point |
| 6 | UL RSS | RSS of Probe request frame measured by access point |
| 7 | AP Noise level | Noise Level measured by access point |
| 8 | Station count | The number of devices coupled to access point - BSS Load element IE |
| 9 | Channel Utilization | Channel utilization measured by access point - BSS Load element IE |

As described, the access points supporting the ANQP may receive the ANQP query frame from user equipment 100. The Access points transmit an ANQP response frame to user equipment 100. For example, the access points collect information related to the quality parameters of the Generic Query List and the Vendor Specific Query List and generate the ANQP response frame to include the collected information. The access points transmit the generated ANQP response frame to user equipment 100.

At step 5030, user equipment 100 may receive the ANQP query response from access points 200 around user equipment 100. At step 5040, user equipment 100 may extract information on the quality parameters included in the ANQP response and analyze the extracted information. User equipment 100 may estimate quality of wireless links based on the analysis.

At step 5050, user equipment 100 may eliminate access points with poor wireless link quality from the access points supporting the ANQP. For example, user equipment 100 may extract information from the WAN Metric from the ANQP response frame. The information extracted from the WAN Metric may include downlink speeds of a backhaul, uplink speeds of a backhaul, downlink load amount, uplink load amount, and information about statuses of a backhaul link. User equipment 100 may compare the information extracted from the WAN Metric and allowable access conditions in the ANQP response frame and eliminate access points not satisfying the allowable access conditions. User equipment 100 may further compare the allowable access conditions of quality parameters included in the ANQP response frame, current states of quality parameters measured by access points, and current states of quality parameters measured by user equipment 100. User equipment 100 may eliminate access points not satisfying the allowable access conditions from the access points supporting the ANQP. At step 5060, user equipment 100 may select one access point that provide a comparatively best wireless link quality based on the analysis result and be coupled to the selected access point through authentication and association.

Beside the quality parameters in the probe response frame and the ANQP frames, user equipment may use new frames to select a proper access point in accordance with another embodiment. For example, a link quality measurement (LQM) protocol may be defined to select one from available access points in accordance with at least one embodiment. In the LQM protocol, a LQM request frame and a LQM response frame may be exchanged between two parties such as user equipment and access points.

The LQM protocol in accordance with at least one embodiment will be described with reference to a wireless local area network shown in FIG. 1 that user equipment 100 located at an overlapped service area of access points 201 to 203. User equipment 100 may use the LQM protocol to select one of access points 201 to 203. Through the LQM protocol, user equipment 100 may obtain a further accurate estimation result of wireless link quality of access points 201 to 203. In particular, user equipment 100 may transmit a LQM request frame to access points 201 to 203 and receive a LQM response frame from access points 201 to 203. The present invention, however, is not limited thereto. That is, access points 201 to 203 may transmit a LQM request frame to user equipment 100 and user equipment 100 transmit a LQM response frame to access points 201 to 203 in response to the LQM request frame.

The LQM protocol may not need to be initiated by user equipment 100. The LQM protocol may be initiated from either user equipment 100 or access points 201 to 203. When the LQM protocol is initiated by user equipment 100, a LQM frame sent by user equipment 100 may be a LQM request frame, and a LQM frame sent by access points 201 to 203 may be a LQM response frame. When the LQM protocol is initiated by one of access points 201 to 203, a LQM frame sent by one of access points 201 to 203 may be a LQM request frame and a LQM frame sent by user equipment 100 may be a LQM response frame. For convenience and ease of understanding, selecting an access point will be described as initiated by user equipment 100, but the present invention is not limited thereto.

For the LQM protocol, new frames may be defined as a LQM frame in accordance with at least one embodiment. However, the present invention is not limited thereto. For example, a Vendor Specific type 802.11 action frame (category 126 or 127) may be used as a LQM frame in the LQM protocol.

The LQM protocol may provide more accurate information about wireless link quality. In order to provide accurate information on the wireless link quality, user equipment 100 and access points 201 to 203 repeatedly exchange a LQM request frame and a LQM response frame in the LQM protocol. While exchanging, user equipment 100 and access points 201 to 203 continuously update information on the number of sent or received frames (e.g., frame count) and on average quality parameter values (e.g., received signal strength indicator (RSSI)) and record the updated information in each frame. Accordingly, the LQM protocol may provide user equipment 100 with information on the wireless link quality even when a part of frame is lost during exchanging the frames as well as providing further accurate information on the wireless link quality in accordance with at least one embodiment.

Hereinafter, a LQM request frame and a LQM response frame will be described with reference to Table 6 and Table 7 below. For convenience and ease of understanding, a Vendor Specific type 802.11 action frame (category 126 or 127) will be described as being used as the LQM request frame and the LQM response frame for the LQM protocol, but the present invention is not limited thereto.

Table 6 shows a structure of LQM request frame 600 and Table 7 shows a structure of LQM response frame 700 in accordance with at least one embodiment.

TABLE 6

|  | Category 601 | Action Field 602 | Dialog Token 603 | Mode Field 604 | Measurement Field 605 |
|---|---|---|---|---|---|
| LQM request frame 600 | (126/127) | (LQW request) |  | Start/ Continue/ End | Avg RSSI/ Frame count |

TABLE 7

|  | Category 701 | Action Field 702 | Dialog Token 703 | Mode Field 704 | Measurement Field 705 |
|---|---|---|---|---|---|
| LQM request frame 700 | (126/127) | (LQW Response) |  | Start/ Continue/ End | Avg RSSI/ Frame count |

As shown in Table 6 and Table 7, LQM request frame 600 and LQM response frame 700 may include Category 601, 701, Action Field 602, 702, Dialog Token 603, 703, Mode Field 604, 704, and Measurement Field 605 and 705. Action field 602 or 702 indicates whether a corresponding frame is a LQM request frame or a LQM response frame, Dialog Token field 603 or 703 separates one pair of a LQM request frame and a LQM response frame from the other, Mode field 604 or 704 indicates whether a corresponding LQM frame is for start, continue, or end of a corresponding LQM procedure. Measurement field 605 or 705 may include information on wireless link quality. That is, the measurement field includes quality parameters that indicate wireless link quality estimated based on a signal transmitted from the other party.

For example, according to the LQM protocol, user equipment 100 generates and transmits LQM request frame 600 to access points 201 to 203 and access points 201 to 203 generate and transmit LQM response frame 700 to user equipment 100 in response to LQM request frame 600. In this case, measurement field 605 of LQM request frame 600 includes quality parameters indicating wireless link quality estimated by measuring values of quality parameters of LQM response frame 700 from access points 201 to 203. Furthermore, measurement field 705 of LQM response frame 700 includes quality parameters indicating wireless link quality estimated by measuring values of quality parameters of LQM request frame 600 from user equipment 100.

For example, the quality parameters included in Measurement field 605 or 705 may include average signal strength (e.g., RSSI) of LQM frames and the number of LQM frames (e.g., frame count), received from an opponent since a corresponding LQM procedure has begun.

Hereinafter, a method of selecting one of access points and managing a link to the selected access point using such LQM frames of the LQM protocol in accordance with at least one embodiment with reference to FIG. 6. For convenience and ease of understanding, user equipment 100 will be described as transmitting a LQM request frame and access points 201 to 202 will be described as receiving a LQM request frame from user equipment 100 and transmitting a LQM response frame to user equipment 100, but the present invention is not limited thereto. That is, access point 201 may transmit a LQM request frame to user equipment 100 and user equipment 100 may transmit a LQM response frame to access point 201.

Figure 6:
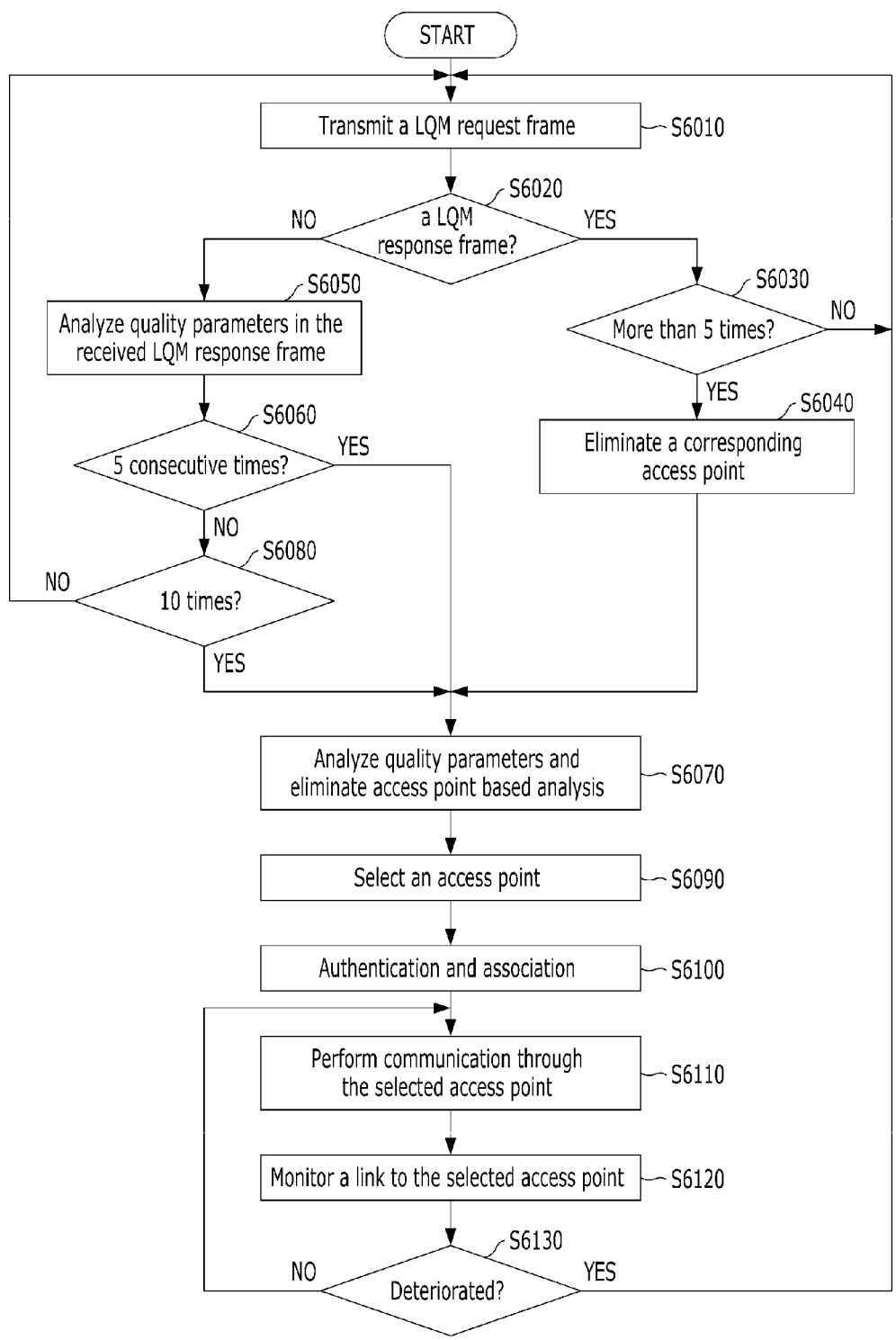
FIG. 6 illustrates a method of selecting one of access points and maintaining a proper wireless link quality using a LQM protocol in accordance with at least one embodiment.

FIG. 6 illustrates a method of selecting one of access points and maintaining a proper wireless link quality using a LQM protocol in accordance with at least one embodiment.

Referring to FIG. 6, user equipment 100 transmits a LQM request frame to access points 201 to 203 upon detection of multiple available access points at step S6010. That is, a LQM procedure may be initiated upon generation of a predetermined event. In accordance with at least one embodiment, the LQM procedure may be set to transmit a LQM request frame 10 times, but the present invention is not limited thereto. Furthermore, LQM request frame 600 and LQM response frame 700 are used for the LQM procedure. User equipment 100 transmits the LQM request frame as described in FIG. 7. At step S6020, user equipment 100 determines whether a LQM response frame is received from access points 201 to 203 within a predetermined time period after transmitting the LQM request frame.

When user equipment 100 does not receive a LQM response frame from one of access points 201 to 203 within a predetermined time period (No—S6020), user equipment 100 determines whether more than five LQM request frames had been transmitted to the one without receiving a LQM response frame at step S6030. When no more than five LQM request frames are transmitted to the one not transmitting a LQM response frame (No—S6030), user equipment 100 transmits another LQM request frame to the one not transmitting a LQM response frame at step S6010. When more than five LQM request frames are already transmitted (Yes—S6030), user equipment 100 determines whether the one not transmitting a LQM response frame has improper link quality and eliminates the one not transmitting a LQM response frame from a candidate access point list at step S6040. An access point is described as being eliminated if the access point does not transmit a LQM response frame five times, but the present invention is not limited thereto. For example, when the access point does not transmit a LQM response frame three times, four times, or ten times, such an access point may be eliminated from the candidate access point list.

When user equipment 100 receives a LQM response frame within a predetermined time period from one of access point 201 to 203 (Yes—S6020), user equipment 100 analyzes a wireless link quality of the one transmitting the LQM response frame based on quality parameters in the received LQM response frame and store the analyzed result at step S6050.

At step S6060, user equipment 100 determines whether user equipment 100 receives the LQM response frame from the one transmitting the LQM response frame five consecutive times. When user equipment 100 receives the LQM response frame from the one five consecutive times (Yes—S6060), user equipment 100 stops transmitting the LQM request frame to the one transmitting the LQM response frame, analyzes wireless link quality to the one based on quality parameters in the LQM response frames received from access points 201 to 203, and eliminates access points having improper wireless link quality from the candidate list at step S6070. When user equipment 100 does not receive the LQM response frame from the one five consecutive times (No—S6060), user equipment 100 determines whether more than ten LQM request frames are transmitted at step S6080. When no more than ten LQM request frames are transmitted (No—S6080), user equipment 100 transmits another LQM request message to access points 201 to 203 at step S6010. When ten LQM request frames are transmitted (Yes—S6080), user equipment 100 stops transmitting the LQM request frame, analyzes wireless link quality to access points 201 to 203 based on quality parameters in the LQM response frames received from access points 201 to 203, and eliminates access points having improper wireless link quality from the candidate list at step S6070.

User equipment is described as interrupting transmission of a LQM request frame if the user equipment receives a LQM response frame more than five consecutive times and if the user equipment transmits a LQM request frame more than ten times, but the present invention is not limited thereto. For example, such a number of transmissions may be set by at least one of a user, a service provider, a system designer, and an operator.

At step S6090, user equipment 100 may select one of remaining access points in the candidate list based on associated quality parameters in the LQM response frames and the LQM request frames. Since the selection method was already described with reference to FIG. 7 and FIG. 8, the detailed description thereof will be omitted herein.

At step S6100 and step S6110, user equipment 100 may perform authentication and association with the selected access point and perform communication through the selected access point.

At step S6120, user equipment 100 monitors a wireless link quality to the selected access point by exchanging LQM request frame 600 and LQM response frame 700 or by exchanging LQI request frame 800 and LQI response frame 900 with the selected access point. Such an operation for monitoring using LQM request frame 600 and LQM response frame 700 and using the LQI request frame 800 and LQI response frame 900 will be described in more detail with reference to FIG. 7 and FIG. 8 or Table 8 and Table 9 later.

At step S6130, user equipment 100 determines whether the wireless link quality to the selected access point is deteriorated based on information included in the LQI response frame. When the wireless link quality is deteriorated (Yes—S6130), user equipment 100 performs the selection procedure again at step S6010 to select another access point. When the wireless link quality is not deteriorated (No—S6130), user equipment 100 may continuously perform communication through the selected access point at step S6110.

Figure 7:
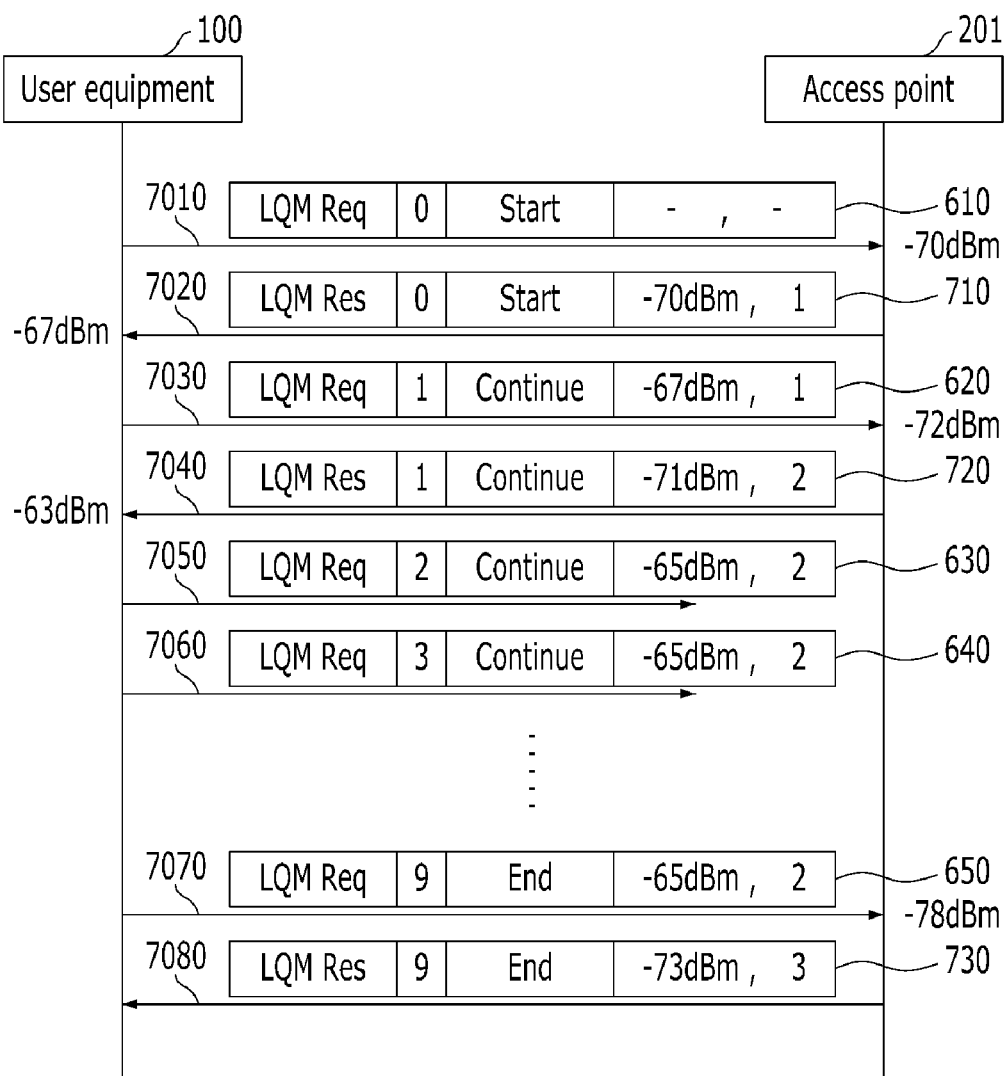
FIG. 7 illustrates exchanging LQM frames between user equipment and access points in accordance with at least one embodiment.
Figure 8:
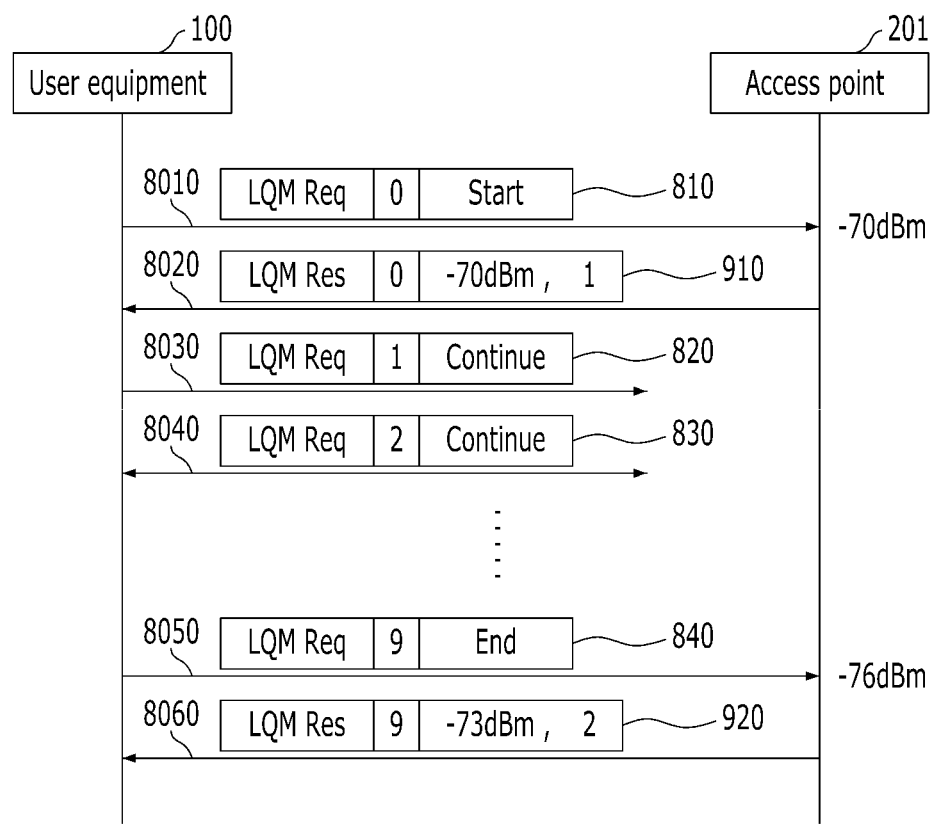
FIG. 8 illustrates exchanging LQM frames between user equipment and access points in accordance with another embodiment.

Hereinafter, the LQM operation performed according to the LQM protocol will be described in more detail with FIG. 7 and FIG. 8. For convenience and ease of understanding, user equipment 100 will be described as initiating an LQM procedure and transmitting a LQM request message to access point 201, but the present invention is not limited thereto. For example, user equipment 100 transmits the LQM request message to a plurality of access points, for example access points 201 to 203, and selects one of the access points. In FIG. 7 and FIG. 8, exchanging a LQM request message and a LQM response message between user equipment 100 and access point 201 and updating quality parameters in the LQM request message and the LQM response message will be mainly described.

FIG. 7 illustrates exchanging LQM frames between user equipment and access points in accordance with at least one embodiment.

Referring to FIG. 7, according to the LQM protocol, LQM request frames and LQM response frames may be exchanged between user equipment and access points by predetermined times. Such a repetition time may be determined by at least one of a user, a system designer, an operator, and a service provider. After exchanging the LQM frames, at least one of access points may be selected based on wireless link quality measured based on the LQM frames exchanged between the user equipment and the access point.

In particular, user equipment 100 may transmit LQM request frame 601 to access point 201 upon generation of a predetermined event at step 7010. That is, the LQM procedure may be initiated by various events, such as detecting multiple available access points or receiving a predetermined initiation signal. Upon generation of such event, user equipment 100 may generate LQM request frame 610 having an action field marked as "LQM Req", a dialogue token marked as "0", a mode field marked as "start", and a measurement field having null value. That is, since frame 610 is a LQM request frame, the action field is marked as "LQM Req." Since the LQM procedure is just initiated, the mode field is marked as "start." Furthermore, since user equipment 100 did not receive any response frame from access point 201, the Measurement field has null value.

At step S7020, access point 201 receives LQM request frame 610 from user equipment 100, measures a signal strength of the LQM request frame, calculates an average signal strange of the LQM request frame, counts the number of received LQM request frame from user equipment 100, generates a LQM response frame based on the average signal strength (e.g., average RSSI) and the counted number of received LQM request frame (e.g., frame count), and transmit the generated LQM response frame to user equipment 100.

For example, upon the receipt of LQM request frame 610, access point 201 measures the received signal strength of the LQM request frame from user equipment 100 as about −70 dBm. Access points 200 calculates an average signal strength based on a currently measured signal strength of the LQM request frame and previously measured signal strengths of previously received LQM request frames. Since LQM request frame 610 is the first LQM request frame, the average signal strength of the LQM request frame is about −70 dBm. That is, the signal strength of LQM request frame 610 is the average signal strength.

In addition, access point 201 counts the cumulated number of LQM request frames received from user equipment 100. Since this is the first LQM request frame from user equipment 100, the cumulated number of LQM request frames is 1.

Access point 201 generates LQM response frame 710 by including the calculated average signal strength (e.g., −70 dBM, average RSSI) and the cumulated number (e.g., 1, frame count) in a measurement field of LQM response frame 710. Since access point 201 generates LQM response frame 710 as a first LQM response frame, in response to LQM request frame 610, access point 201 records an action field as "LQM Res" indicating a LQM response frame, records a dialogue token as "0" indicating a pair with LQM request frame 610, and records a mode field as "start."

At step S7030, user equipment 100 receives LQM response frame 710 from access point 200, measures a signal strength of the LQM response frame 710, such as about −67 dBm, calculates an average signal strength of LQM response frames, counts a cumulated number of LQM response frames from access point 201, generates LQM request frame 620 based on the average signal strength and the cumulated number, and transmit the generated LQM request frame 620 to access point 201.

For example, upon the receipt of LQM response frame 710, user equipment 100 measures the received signal strength of LQM response frame 710 as about −67 dBm. User equipment 100 calculates an average signal strength of the LQM response frame. Since LQM response frame 710 is the first LQM response frame, the average signal strength of the LQM request frame is about −67 dBm. That is, the signal strength of LQM response frame 710 is the average signal strength.

In addition, user equipment 100 counts the cumulated number of LQM response frames received from access point 201. Since this is the first LQM response frame from access point 201, the cumulated number of LQM request frames is 1.

User equipment 100 generates LQM request frame 620 by including the calculated average signal strength (e.g., −67 dBM, average RSSI) and the cumulated number (e.g., 1, frame count) in a measurement field of LQM request frame 620. Since user equipment 100 generates LQM request frame 620 in response to LQM response frame 710, user equipment 100 records an action field as "LQM Req" indicating a LQM request frame, records a dialogue token as "1" indicating a pair with LQM response frame 720, and records a mode field as "Continue."

At step S7040, access point 201 receives LQM request frame 620 from user equipment 100, measures a signal strength of LQM request frame 620, calculates an average signal strange of the LQM request frame, counts the number of received LQM request frame from user equipment 100, generates LQM response frame 720 based on the average signal strength (e.g., average RSSI) and the counted number of received LQM request frame (e.g., frame count), and transmit generated LQM response frame 720 to user equipment 100.

For example, upon the receipt of LQM request frame 620, access point 201 measures the received signal strength of the LQM request frame from user equipment 100 as about −72 dBm. Access points 200 calculates an average signal strength of the LQM request frames, for example, about −71 dBm. In addition, access point 201 counts the cumulated number of LQM request frames received from user equipment 100, for example, 2. Access point 201 generates LQM response frame 720 by including the calculated average signal strength (e.g., −71 dBM, average RSSI) and the cumulated number (e.g., 2, frame count) in a measurement field of LQM response frame 710. Furthermore, access point 201 records an action field as "LQM Res" indicating a LQM response frame, records a dialogue token as "1" indicating a pair with LQM request frame 620, and records a mode field as "Continue."

At step S7050, user equipment 100 receives LQM response frame 720 from access point 200, measures a signal strength of the LQM response frame 710, such as about −63 dBm, calculates an average signal strength of LQM response frames, counts a cumulated number of LQM response frames from access point 201, generates LQM request frame 630 based on the average signal strength and the cumulated number, and transmit the generated LQM request frame 630 to access point 201.

For example, upon the receipt of LQM response frame 720, user equipment 100 measures the received signal strength of LQM response frame 710 as about −63 dBm. User equipment 100 calculates an average signal strength of the LQM response frame. The average signal strength of the LQM request frame is about −65 dBm. In addition, user equipment 100 counts the cumulated number of LQM response frames received from access point 201 as 2. User equipment 100 generates LQM request frame 630 by including the calculated average signal strength (e.g., −63 dBM, average RSSI) and the cumulated number (e.g., 2, frame count) in a measurement field of LQM request frame 630. Since user equipment 100 generates LQM request frame 630 in response to LQM response frame 720, user equipment 100 records an action field as "LQM Req" indicating a LQM request frame, records a dialogue token as "2" indicating a pair with a corresponding LQM response frame, and records a mode field as "Continue."

At step S7060, user equipment 100 may generate another LQM request frame 640 when user equipment 100 did not receive any LQM response frame in response to previous LQM request message 630 for a predetermined time and transmit generated LQM request frame 640 to access point 201. For example, user equipment 100 generate LQM request frame 640 including "LQM Req" as an action field, "3" as a dialog token, "Continue" as a mode field, and "−65 dBm" as an average RSSI and "2" as a frame count in a measurement field.

As described above, the LQM protocol in accordance with at least one embodiment enables estimating wireless link quality even when a part or an entire LQM frame is lost. For example, LQM request frame 630 may be lost before arrived at access point 201. In this case, access point 201 may use information on LQM request frame 620 to ascertain that user equipment 100 has received LQM response frame 710 and the signal strength of LQM response frame 710 received by user equipment 100 is about −67 dBm. Furthermore, user equipment 100 may use information from LQM response frame 720 to ascertain that access point 210 received two LQM request frames 610 and 620 and the average signal strength of two LQM request frames is −71 dBm.

At step S7070, user equipment 100 may generate and transmit $10^{th}$ LQM request frame 650 to access point 201. Since the LQM protocol may define the repetition time of exchanging a LQM frame as 10, the $10^{th}$ LQM request frame may be the last LQM request frame for selecting an access point. Accordingly, user equipment 100 generates $10^{th}$ LQM request frame 650 to include "LQM Req" as an action field, "9" as a dialog token, "End" as a mode field, and "−65 dBm" as an average RSSI and "2" as a frame count in a measurement field.

At step S7080, access point 200 receives $10^{th}$ LQM request frame 650 from user equipment 100, measures a signal strength of LQM request frame 650 (e.g., about −78 dBm), calculates an average signal strange of the LQM request frame, counts the number of received LQM request frame from user equipment 100, generates LQM response frame 730 based on the average signal strength (e.g., average RSSI) and the counted number of received LQM request frame (e.g., frame count), and transmit generated LQM response frame 730 to user equipment 100.

For example, after losing $3^{rd}$ LQM request frame 630 to $9^{th}$ LQM request frame from user equipment 100, access point 201 receives $10^{th}$ LQM request frame 650 (e.g., the last LQM request frame from). Access point 201 measures the received signal strength of LQM request frame 650, as about −78 dBm. Access points 200 calculates an average signal strength of the LQM request frames, for example, about −73 dBm. In addition, access point 201 counts the cumulated number of LQM request frames received from user equipment 100, for example, 3. Access point 201 generates LQM response frame 730 by including the calculated average signal strength (e.g., −73 dBM, average RSSI) and the cumulated number (e.g., 3, frame count) in a measurement field of LQM response frame 710. Furthermore, access point 201 records an action field as "LQM Res" indicating a LQM response frame, records a dialogue token as "9" indicating a pair with LQM request frame 650, and records a mode field as "End."

As described, $10^{th}$ LQM response frame 730 may be the last LQM response frame. User equipment 100 receives $10^{th}$ LQM response frame 730 and analyzes the measurement field of LQM response frame 730. As the analysis result, user equipment 100 determines the average SSI of the LQM request frames is about −73 dBm and the number of LQM request frames to arrive at access point 201 is three. Such information may be used to select one of access points in accordance with at least one embodiment.

In FIG. 7, user equipment 100 and access point 210 were described as measuring wireless link quality and feeding back the measurement result to the other party, but the present invention is not limited thereto. In accordance with another embodiment, the LQM protocol may control only one of user equipment 100 and access point 210 to measure wireless link quality and to report the measurement to the other.

For example, user equipment may request access points to measure wireless link quality without measuring the wireless link quality. In response to the request, the access points measure wireless link quality and report the result to the user equipment. Hereinafter, such operation of the LQM protocol will be described with reference to FIG. 8.

FIG. 8 illustrates exchanging LQM frames between user equipment and access points in accordance with another embodiment.

Referring to FIG. 8, user equipment 100 generates LQM request frame 810 upon generation of a predetermined event and transmits generated LQM request frame 810 to access point 210 at step S8010. For example, since user equipment 100 does not measure wireless link quality but requests access point 201 to measure and report the wireless link quality, LQM request frame 810 may not include a measurement field as shown in FIG. 8. According to the LQM protocol, LQM request frames and LQM response frames may be exchanged between user equipment and access points by predetermined times. Such a repetition time may be determined by at least one of a user, a system designer, an operator, and a service provider. After exchanging the LQM frames, at least one of access points may be selected based on wireless link quality measured based on the LQM frames exchanged between the user equipment and the access point. In FIG. 8, the repetition time is set as 10 times, but the present invention is not limited thereto.

That is, the LQM procedure may be initiated by various events, such as detecting multiple available access points or receiving a predetermined initiation signal. Upon generation of such event, user equipment 100 may generate LQM request frame 810 having an action field marked as "LQM Req", a dialogue token marked as "0", and a mode field marked as "start". That is, since frame 810 is a LQM request frame, the action field is marked as "LQM Req." Since the LQM procedure is just initiated, the mode field is marked as "start." Furthermore, since user equipment 100 does not measure wireless link quality, LQM request frame 810 does not have the measurement field.

At step S8020, access point 201 receives LQM request frame 810 from user equipment 100, measures a signal strength of LQM request frame 810, calculates an average signal strange of the LQM request frame, counts the number of received LQM request frame from user equipment 100, generates a LQM response frame based on the average signal strength (e.g., average RSSI) and the counted number of received LQM request frame (e.g., frame count), and transmit the generated LQM response frame to user equipment 100.

For example, upon the receipt of LQM request frame 810, access point 201 measures the received signal strength of the LQM request frame from user equipment 100 as about −70 dBm. Access points 200 calculates an average signal strength based on a currently measured signal strength of the LQM request frame and previously measured signal strengths of previously received LQM request frames. Since LQM request frame 810 is the first LQM request frame, the average signal strength of the LQM request frame is about −70 dBm. That is, the signal strength of LQM request frame 810 is the average signal strength.

In addition, access point 201 counts the cumulated number of LQM request frames received from user equipment 100. Since this is the first LQM request frame from user equipment 100, the cumulated number of LQM request frames is 1.

Access point 201 generates LQM response frame 910 by including the calculated average signal strength (e.g., −70 dBM, average RSSI) and the cumulated number (e.g., 1, frame count) in a measurement field of LQM response frame 910. Since access point 201 generates LQM response frame 910 as a first LQM response frame, in response to LQM request frame 810, access point 201 records an action field as "LQM Res" indicating a LQM response frame and records a dialogue token as "0" indicating a pair with LQM request frame 710. Since access point 201 measures the wireless link quality only in response to the request from user equipment 100, LQM response frame 910 does not include a mode field as shown in FIG. 8.

At step S8030, user equipment 100 receives LQM response frame 910 from access point 201, generates LQM request frame 820, and transmit the generated LQM request frame 820 to access point 201. Since user equipment 100 does not measure wireless link quality but just request access point 201 to measure the wireless link quality, user equipment 100 generates LQM request frame 820 without having a measurement field. In particular, user equipment 100 generates LQM request frame 820 by including an action field as "LQM Req" indicating a LQM request frame, a dialogue token as "1" indicating a pair with a corresponding LQM response frame, and records a mode field as "Continue."

At step S8040, user equipment 100 may generate another LQM request frame 830 when user equipment 100 did not receive any LQM response frame in response to previous LQM request message 820 for a predetermined time and transmit generated LQM request frame 830 to access point 201. For example, user equipment 100 generate LQM request frame 830 including "LQM Req" as an action field, "2" as a dialog token, and "Continue" as a mode field.

At step S8050, user equipment 100 may generate and transmit $10^{th}$ LQM request frame 840 to access point 201. Since the LQM protocol may define the repetition time of exchanging a LQM frame as 10, the $10^{th}$ LQM request frame may be the last LQM request frame for selecting an access point. Accordingly, user equipment 100 generates $10^{th}$ LQM request frame 840 to include "LQM Req" as an action field, "9" as a dialog token, and "End" as a mode field.

At step S8060, access point 200 receives $10^{th}$ LQM request frame 840 from user equipment 100, measures a signal strength of LQM request frame 840 (e.g., about −76 dBm), calculates an average signal strange of the LQM request frame, counts the number of received LQM request frame from user equipment 100, generates LQM response frame 920 based on the average signal strength (e.g., average RSSI) and the counted number of received LQM request frame (e.g., frame count), and transmit generated LQM response frame 920 to user equipment 100.

For example, after losing $2^{nd}$ LQM request frame 820 to $9^{th}$ LQM request frame from user equipment 100, access point 201 receives $10^{th}$ LQM request frame 840 (e.g., the last LQM request from). Access point 201 measures the received signal strength of LQM request frame 840, as about −76 dBm. Access point 201 calculates an average signal strength of the LQM request frames, for example, about −73 dBm. In addition, access point 201 counts the cumulated number of LQM request frames received from user equipment 100, for example, 2. Access point 201 generates LQM response frame 920 by including the calculated average signal strength (e.g., −73 dBM, average RSSI) and the cumulated number (e.g., 2, frame count) in a measurement field of LQM response frame 710. Furthermore, access point 201 records an action field as "LQM Res" indicating a LQM response frame and records a dialogue token as "9" indicating a pair with LQM request frame 840.

Access points may monitor wireless link quality using the LQM protocol in accordance with at least one embodiment. Furthermore, access points may statistically manage correlation between wireless link quality and various quality parameters and provide user equipment with predetermined references to access an access point based on quality parameters. For example, access points may measure a quality parameter that provide a minimum link quality to user equipment and provide the measured quality parameter as a selection reference. Furthermore, access points may measure a quality parameter that provide a wireless link quality with a predetermined quality level and provide the measured quality parameter as a selection reference.

After user equipment measures various quality parameters indicating a wireless link quality of each access point using the LQM protocol, the user equipment may eliminate access points having relatively poor wireless link quality from selection based on the measured quality parameters. When user equipment detects multiple available access points, user equipment may prioritize quality parameters, assign a predetermined weight to each quality parameters, and try to select one based on the prioritized or weighted quality parameters. Furthermore, the user equipment may try to access the access points in an order of priorities or weights of quality parameters.

After selecting an access point having the best wireless link quality or a proper wireless link quality, user equipment may be coupled to the selected access point and perform communication through the selected access point. However, user equipment may not maintain the wireless link quality although the user equipment selects the access point providing the best wireless link quality because the wireless link quality continuously changes by various factors, such as changes in radio environment and in location of the user equipment.

In accordance with at least one embodiment, the LQM protocol (e.g., LQM request/response frames) or a link quality information (LQI) request frame and a LQI response frame may be used to manage and maintain wireless link quality of a link to an access point after selecting the access point and establish the link to the selected access point. For example, the user equipment and the selected access point exchange LQI request/response frames at a predetermined regular interval and monitor wireless link quality based on the quality parameters. When the wireless link quality is deteriorated under a predetermined level, the user equipment and access points perform the LQM protocol based selection procedure again to select new access point providing a better wireless link quality. Alternatively, the user equipment may disconnect connection to the selected access point and access to a mobile communication network.

In order to maintain the wireless link quality at a proper level, a wireless link between user equipment and an access point may be monitored after the user equipment select the access point to have a communication service and establishes the link to the access point in accordance with at least one embodiment. When a wireless link quality is deteriorated below a predetermined level, the user equipment may try to access another access point or try to switch to a mobile communication network.

As described, in order to monitor the wireless link quality, a LQI protocol will be used in accordance with at least one embodiment. For example, a LQI request frame and a LQI response frame may be exchanged between user equipment and a servicing access point according to the LQI protocol. As described, such operation may be initiated through transmitting a LQI request frame by one of the user equipment and the servicing access point. As the LQI request frame and the LQI response frame, a Vendor Specific type 802.11 action frame (category 126 or 127) may be used in accordance with at least one embodiment, but the present invention is not limited thereto.

In particular, user equipment may transmit a LQI request frame to a servicing access point and the servicing access point transmits a LQI response frame in response to the LQI request frame. Table 8 illustrates a LQI request frame and Table 9 illustrates a LQI response frame.

TABLE 8

| Category 801 | Action Field 802 | Dialog Token 803 | Trigger Bitmap 804 |
| --- | --- | --- | --- |
| (126/127) | (LQI request) | | |

TABLE 9

| Category 901 | Action Field 902 | Dialog Token 903 | Trigger Bitmap 904 | Link Quality Info 905 |
| --- | --- | --- | --- | --- |
| (126/127) | (LQI Response) | | | RSSI/Noise/ FER/CH.Util |

As shown in Table 8 and Table 9, the LQI request frame and the LQI response frame include category field 801 or 901, action field 802 or 902, dialog token field 803 or 903, and trigger bitmap field 804 and 904. Unlike the LQI request frame, the LQI response frame include link quality info field 905. Action field 802 or 902 indicates whether a corresponding frame is a LQI request frame or a LQI response frame and Dialog Token field 803 or 903 separates one pair of a LQI request frame and a LQI response frame from the other.

Triggered Bitmap field 804 or 904 may include information on a list of target quality parameters to monitor. For example, such a quality parameter list may include various parameters such as a received signal strength (e.g., RSS) of an uplink signal, a noise level, a frame error rate (e.g., FER), and a channel utilization (e.g., CH.Util).

Triggered Bitmap field 804 or 904 may have a bitmap format. For example, among quality parameters in the quality parameter list, a quality parameter requested to be monitored may be marked as "1," and a quality parameter not requested to be monitored may be marked as "0." Four quality parameters are shown in Table 8 and Table 9 as the quality parameter list. The four quality parameters may include the RSS, the Noise level, the FRR, and/or the CH.Util. For example, user equipment 100 may request access points 201 to 203 to monitor the RSS. In this case, user equipment 100 may generate a LQM request frame having a Triggered Bitmap field configured as "1 0 0 0." In response to the LQM request frame, access points 200 may monitor the RSS and transmit a LQI response frame to user equipment 100 with a result of monitoring the RSS.

Triggered Bitmap field 904 of the LQI response frame may be configured with the same value as Triggered Bitmap field 804 in the LQI request frame. For example, access points 200 may constantly monitor quality parameters requested by user equipment 100. When the monitoring result of the requested quality parameter does not satisfy to maintain the link, access points 200 may transmit the LQI response frame to user equipment 100.

Link Quality Info field 905 of the LQI response frame may include information on the monitored states of quality parameters. Access points 200 may monitor the RSS, as explained in the above example. When the monitored RSS does not satisfy to maintain the link, access points 200 may transmit the LQI response frame with the monitored RSS stored in Link Quality Info field 905. In addition, access points 200 may store, as monitoring results, information about the current states of other quality parameters, the Noise, the FER, and the CH. Util, in the Link Quality Info field 905 and transmit the LQI response frame to user equipment 100.

In accordance with at least one embodiment, access points 200 may regularly transmit the LQI response frame although access points 200 did not receive the LQI request frame from user equipment 100 because the LQI request frame from user equipment 100 might be lost during transmission.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of selecting one of access points by user equipment in a wireless local area network, the method comprising:
   receiving a probe response frame from access points;
   performing a first analysis process for analyzing quality parameters included in the received probe response frame to estimate wireless link quality of each access point;
   selecting candidate access points from the access points based on the analysis result;
   determining whether each of the candidate access points supports a predetermined standard protocol;
   when the predetermined standard protocol is supported, transmitting a query frame of the predetermined standard protocol to the selected candidate access points, wherein the query frame excludes a probe request frame;
   receiving a response frame of the predetermined standard protocol from the selected candidate access points, wherein the response frame excludes a probe response frame;
   performing a second analysis process for analyzing quality parameters based on information included in the received response frame to estimate wireless link quality of each of the selected candidate access points; and
   selecting one from the selected candidate access points based on the analyzing result.

2. The method of claim 1, wherein the received probe response frame includes at least one of a basic service set (BSS) load information element and a vender specific information element.

3. The method of claim 1, wherein the quality parameters include at least one of station count, channel utilization, and available admission capacity.

4. The method of claim 1, wherein the received probe response frame includes information on allowable access conditions of a corresponding access point and current states measured by the corresponding access point.

5. The method of claim 4, wherein:
   the information on allowable access conditions includes at least one of an uplink received signal strength threshold, a downlink received signal strength threshold, a station count threshold, and a channel utilization threshold; and
   the information on current states includes at least one of an uplink received signal strength, an access point noise level, and a wide area network information, measured and collected by a corresponding access point.

6. The method of claim 1, wherein the predetermined standard protocol is an access network query protocol (ANQP) defined in Institute of Electrical and Electronics Engineers (IEEE) 802.11u.

7. The method of claim 1, wherein the standard protocol query frame includes information on a wide area network metric, a downlink speed, an uplink speed, a downlink load, and an uplink load.

8. The method of claim 1, wherein the query frame of the predetermined standard protocol includes information on allowable access conditions of a corresponding access point and current states measured and collected by the corresponding access point.

9. The method of claim 8, wherein:
the information on allowable access conditions includes a neighbor access point list, an uplink received signal strength threshold, a station count threshold, and a channel utilization threshold; and
the information on current states includes an uplink received signal strength, an access point noise level, a station count, and a channel utilization, measured and collected by a corresponding access point.

10. The method of claim 1, comprising:
repeatedly transmitting a link quality measurement request frame to the candidate access points at a predetermined interval for predetermined times;
receiving at least one link quality measurement response frame from the candidate access points in response to the link quality measurement request frames; and
analyzing quality parameters in the received link quality measurement response frame.

11. The method of claim 10, wherein:
the quality parameters of the link quality measurement response frame include a number of link quality measurement request frames received at a corresponding access point and a received signal strength of a link quality measurement request frame, measured by the corresponding access point.

12. The method of claim 10, wherein quality parameters in a latest link quality measurement response frame received by the user equipment are analyzed to select one of the access points.

13. The method of claim 1, comprising:
monitoring a wireless link established to the selected access point.

14. The method of claim 13, wherein the monitoring comprises:
repeatedly transmitting a link quality measurement (LQM) request frame to the selected access point at a predetermined interval for predetermined times;
receiving at least one LQM response frame from the selected access point in response to the LQM request frames;
analyzing quality parameters in the received LQM response frame; and
determining whether to maintain the wireless link established to the selected access point based on the analysis result.

15. The method of claim 13, wherein the monitoring comprises:
transmitting a link quality information (LQI) request frame to the selected access point;
receiving a LQI response frame from the selected access point;
analyzing quality parameters in the received LQI response frame; and
determining whether to maintain the wireless link established to the selected access point based on the analysis result.

16. The method of claim 15, wherein:
the LQI request frame includes a list of quality parameters for requesting a corresponding access point to measure; and
the LQI response frame includes state information on the requested quality parameters.

17. The method of claim 15, wherein an access point receiving the LQI request frame monitors the requested quality parameters in the list and transmits the LQI response frame when the monitoring result of the requested quality parameters is not satisfied by a predetermined condition.

18. A method of selecting one of access points by user equipment in a wireless local area network, the method comprising:
receiving a probe response frame from each access point;
performing a first analysis process for analyzing quality parameters included in the received probe response frame to estimate wireless link quality of each access point;
selecting at least one of the access points as candidate access points based on the analysis result;
transmitting a predetermined standard protocol query frame to the candidate access points, wherein the predetermined standard protocol query frame excludes a probe request frame;
receiving a predetermined standard protocol response frame from the candidate access points, wherein the predetermined standard protocol response frame excludes a probe response frame;
performing a second analysis process for analyzing quality parameters based on information included in the received standard protocol response frame to estimate wireless link quality of each candidate access point;
selecting one of the candidate access points based on the analysis result;
establishing a link to the selected access point; and
monitoring the established link using a link quality measurement protocol.

19. A method of selecting one of access points by user equipment in a wireless local area network, the method comprising:
repeatedly transmitting a link quality measurement request frame to access points at a predetermined interval for predetermined times;
receiving at least one link quality measurement response frame from the access points in response to the link quality measurement request frames;
analyzing quality parameters based on information in the received link quality measurement response frame;
selecting one of the access points based on the analysis result;
establishing a link to the selected access point; and
monitoring the established link using a link quality information request frame and a link quality information response frame.

* * * * *

UNITED STATES PATENT AND TRADEMARK OFFICE
CERTIFICATE OF CORRECTION

Page 1 of 1

PATENT NO. : 9,635,606 B2
APPLICATION NO. : 14/547108
DATED : April 25, 2017
INVENTOR(S) : Jeong et al.

It is certified that error appears in the above-identified patent and that said Letters Patent is hereby corrected as shown below:

In the Claims

In Claim 1, at Column 26, Line 22, after the words "one of", add "a plurality of".
In Claim 18, at Column 28, Line 20, after the words "one of", add "a plurality of".
In Claim 19, at Column 28, Line 48, after the words "one of", add "a plurality of".

Signed and Sealed this
Second Day of March, 2021

Drew Hirshfeld
*Performing the Functions and Duties of the
Under Secretary of Commerce for Intellectual Property and
Director of the United States Patent and Trademark Office*